United States Patent
Goertz (10) Patent No.: US 11,797,314 B2
(45) Date of Patent: *Oct. 24, 2023

(54) APPLICATION FUNCTION LIBRARY FOR CLOUD SYSTEMS

(71) Applicant: SAP SE, Walldorf (DE)

(72) Inventor: Peter Goertz, Walldorf (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/084,854

(22) Filed: Dec. 20, 2022

(65) Prior Publication Data

US 2023/0130202 A1 Apr. 27, 2023

Related U.S. Application Data (63) Continuation of application No. 17/337,210, filed on Jun. 2, 2021, now Pat. No. 11,556,355.

(51) Int. Cl.
| | |
|---|---|
| *G06F 9/44* | (2018.01) |
| *G06F 9/445* | (2018.01) |
| *G06F 8/61* | (2018.01) |
| *G06F 16/245* | (2019.01) |
| *G06F 9/455* | (2018.01) |

(52) U.S. Cl.
CPC ............ *G06F 9/44521* (2013.01); *G06F 8/61* (2013.01); *G06F 9/45508* (2013.01); *G06F 16/245* (2019.01)

(58) Field of Classification Search
CPC .... G06F 9/44521; G06F 9/45508; G06F 8/61; G06F 16/245

USPC .......................................................... 717/176
See application file for complete search history.

(56) References Cited

U.S. PATENT DOCUMENTS

| | | | |
|---|---|---|---|
| 2012/0089860 A1* | 4/2012 | Zaifman | G06F 11/0793 714/2 |
| 2013/0159966 A1* | 6/2013 | Goertz | G06F 8/34 717/106 |
| 2014/0130038 A1* | 5/2014 | Lucovsky | G06F 9/45533 717/176 |
| 2019/0018665 A1* | 1/2019 | Goertz | G06F 8/65 |
| 2022/0206762 A1* | 6/2022 | Makhija | G06F 16/245 |
| 2022/0353295 A1* | 11/2022 | Yeh | G06F 16/245 |

OTHER PUBLICATIONS

Title: Container-based orchestration in cloud: state of the art and challenges, author: A Tosatto et al, published on 2015.*
Title: Building modern clouds: using docker, kubernetes & Google cloud platform author: Jay Shah et al, published on 2019.*

* cited by examiner

*Primary Examiner* — Qamrun Nahar
(74) *Attorney, Agent, or Firm* — Mintz Levin Cohn Ferris Glovsky and Popeo, P.C.

(57) ABSTRACT

A method, a system, and computer program product for application function library installation for cloud-based systems. An application function in a plurality of application functions is executed. The application function is executed using a server instance running in a container. A determination is made that execution of the application function requires an application function library. The application function library for executing of the application function is obtained. The obtained application function library is loaded during runtime of the application function.

20 Claims, 5 Drawing Sheets

APPLICATION FUNCTION LIBRARY FOR CLOUD SYSTEMS

CROSS REFERENCE TO RELATED APPLICATIONS

This Application is a Continuation of U.S. patent application Ser. No. 17/337,210 filed on Jun. 2, 2021, entitled "APPLICATION FUNCTION LIBRARY FOR CLOUD SYSTEMS". The entire contents of this applications is incorporated herein by reference in its entirety.

TECHNICAL FIELD

This disclosure relates generally to data processing and, in particular, to application function library installation for cloud-based systems.

BACKGROUND

Application functions can be database procedures that can be called to perform a variety of operations on data held in a database. For example, application functions may perform operations that cannot be implemented using structure query language (SQL) scripts and are therefore written in a programming language such as, for example, C++ and/or the like. Multiple application functions can be grouped into a single application function library (AFL). For instance, a predictive analysis library can include application functions that perform predictive analysis, data mining, and/or the like.

SUMMARY

In some implementations, the current subject matter relates to a computer implemented method. The method may include executing an application function in a plurality of application functions, the application function being executed using a server instance running in a container, determining that the execution of the application function requires an application function library, obtaining the application function library for the executing of the application function, and loading the obtained application function library during runtime of the application function.

In some implementations, the current subject matter includes one or more of the following optional features. In some implementations, the container may include one or more local file system storages. The obtained application function library may be stored in one or more local file system storages. In some implementations, the loading may include loading, from the local file system storage, the obtained application function library during runtime of another application function.

In some implementations, the server may include at least one of an index server, a script server, and any combinations thereof. In some implementations, the obtaining may include querying a storage location storing the application function library. The storage location may be external to and communicatively coupled to the container. The storage location may store one or more tables that may include a plurality of application function libraries. The obtaining may also include searching, using at least an identifier of the application function library, one or more tables to obtain the requested application function library, and retrieving, based on the searching, the application function library from the tables.

In some implementations, one or more application function libraries in the plurality of application function libraries may be stored in the one or more tables as binary large objects. Further, a structured query language may be used to query the storage location storing the application function library.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

To address these and potentially other deficiencies of currently available solutions, one or more implementations of the current subject matter relate to methods, systems, articles of manufacture, and the like that can, among other possible advantages, provide application function library installation for cloud-based computing systems, where installation may implement structured query language (SQL).

A database system may include a primary database server for processing incoming database queries on data held in the database system. The primary database server may respond to these queries by running one or more application functions from an application function library. An application function may be registered as a database procedure before the application function may be called, for example, by the primary database server in response to a database query. Some application functions that are database procedures may be stored/registered as such, while other application functions may be stored/registered as a function, which may be invoked by one or multiple database procedures. Registering the application function typically requires installing a corresponding application function library, which includes loading the entire application function library into the address space of the primary database server. However, due to the complex programming language (e.g., C++) used to create the application function language, loading the application function library into the address space of the primary database server may generate numerous dependencies (e.g., global variables, memory allocations, trace topics, and/or the like) that prevent the application function library from being unloaded.

An application function library may be a dynamic link library (e.g., it may be a shared object in Linux). Alternatively, or in addition to, the application function library maybe an add-on to an installed database system and thus, may require a separate additional installation. For example, the library may be loaded during runtime (e.g., using C++) into a running executable (e.g., a primary server (e.g., an index server) and/or a secondary server (e.g., script server) executable, etc.). In some cases, the loading may be performed using a database lifecycle manager tool (e.g., HANA Database Lifecycle Manager, as available from SAP SE, Walldorf, Germany). Using this tool, the application function library along with various control files and/or any other files may be copied into a plug-ins subdirectory of the system's run directory. Subsequent to the copying, the installation of the application function library may be triggered. Installation of the library may require one or more calls to an application function library engine and/or a restart of the system.

In some on-premise database systems (e.g., system databases, tenant databases, etc.), the systems' primary and/or secondary servers (e.g., name server(s), index server(s), script server(s), etc.) may be started from the same binary location. However, in cloud-based systems, system servers may be configured for operation using containers, whereby each container may be configured with its own container-local file system. In that regard, application function libraries may be configured to be loaded/executed into separate respective containers. Execution of application functions of the application function libraries may be performed by one or more elastic compute nodes. Elastic compute nodes and/or clusters of nodes may exist on top of Infrastructure as a Service (IaaS) clouds and may scale out to a larger number of compute nodes on demand.

In some implementations, an application function library may be installed at a primary server (e.g., an index server) that has its own container. A secondary server (e.g., a script server) that executes application functions in the application function library may be separated into its own container as well. The application function library may also be installed on the secondary server (e.g., a script server). This may present an issue in scale-out and/or multiple secondary servers (e.g., script servers) and/or cloud database systems with multiple elastic compute nodes as the application function library will have to be installed in multiple containers so that the servers associated with these containers have to execute application functions of the application function library. This may mean the application function library along with all the other files has to be copied into each container.

In some implementations, the current subject matter may be configured to allow on-demand installation/usage of application function libraries without having to install the application function library in every server. This may be accomplished using one or more binary large object (BLOB). A structured query language (SQL) may be used for these purposes. For the purposes of accessing/loading/installing a particular application function library by one or more servers of a cloud database system, the application function library along with any other required files may be stored as a binary large object in a table having a binary large object column, which in turn may be stored by the database system. The table may be shareable by one or more servers (e.g., index server, script server, etc.) of the database system.

To access/load/install a particular application function library, a server, that may require access to the application function library, may execute a call to the database storing the table containing the BLOB with the requisite application function library. The server may then read the BLOB (e.g., using kernel-internal SQL process) and write the application function library (contained in the BLOB) along with any other required files to a local file system of the container in which this server is operating. Once the application function library is loaded into the container's local file system, it can be loaded as shared object into one or more processes that are being executed by the server. One or more catalog objects making up the application function library installation may also be generated.

In some implementations, for any subsequent procedure calls of an application function of the application function library that access a server and/or a compute node of a container that does not yet have the application function library installed in its local file system, that server may be configured to perform a similar procedure as described above. The server may execute a call to the table storing the BLOB with the requisite application function library (e.g., using its kernel-internal SQL process) and install it to the local file system of the container where the server is operating. From there, the application function library may be loaded into one or more running processes to allow for execution of application functions.

Figure 1:
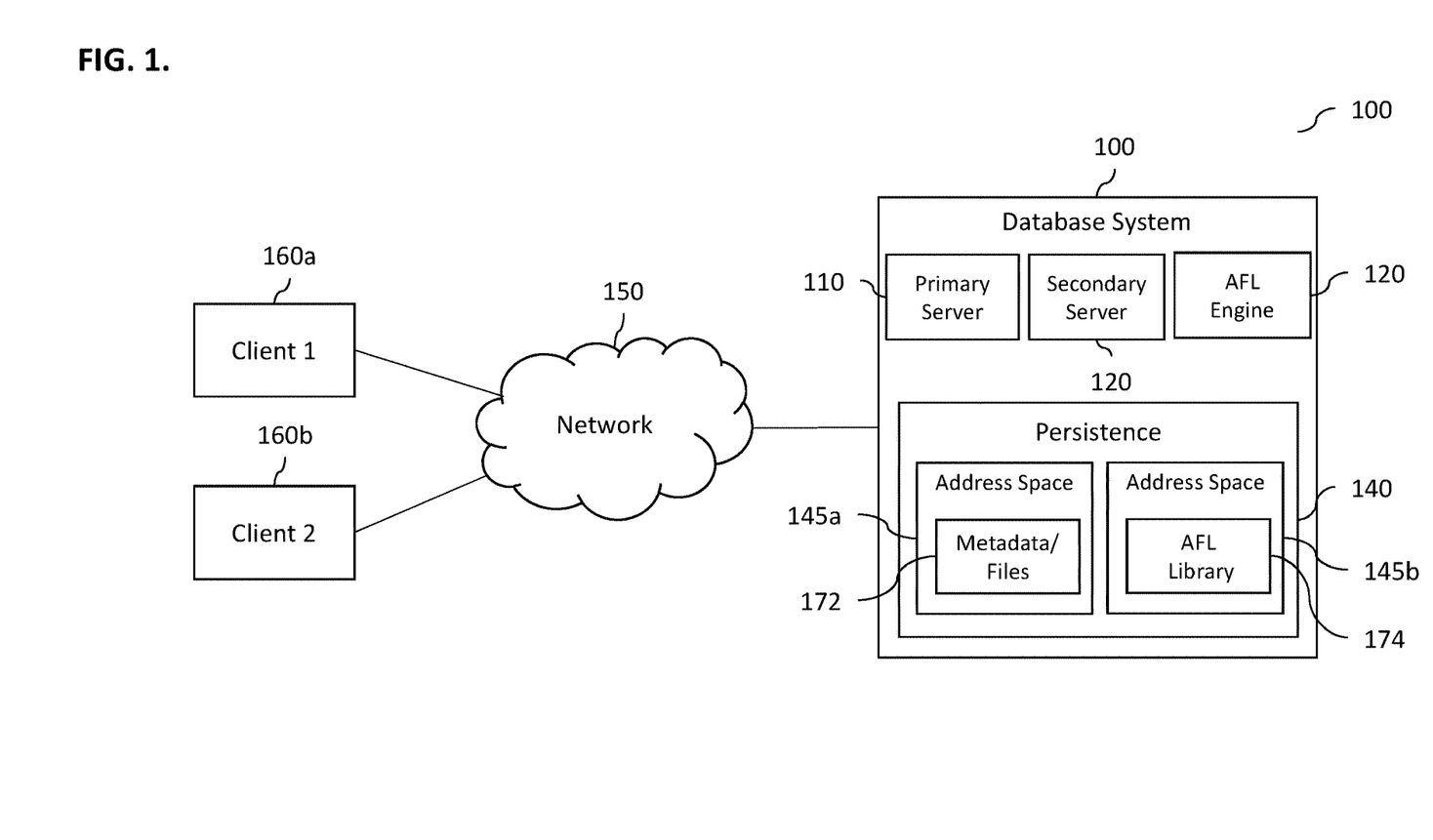
FIG. 1 illustrates an exemplary database system, in accordance with some implementations of the current subject matter.

FIG. 1 illustrates an exemplary database system 100, in accordance with some implementations of the current subject matter. The database system 100 may be any type of database including, for example, an in-memory database, a relational database, a non-SQL (NoSQL) database, and/or the like. In some implementations, the database system 100 and/or any of its components may be incorporated and/or part of a container system that may be used in cloud implementations. As shown in FIG. 1, the database system 100 may include a primary server 110, a secondary server 120, an application function library engine 130, and a persistence 140. Further, the database system 110 may be communicatively coupled, via a network 150, to a plurality of clients including, for example, a first client 160a and a second client 160b. The network 150 may be a wired and/or wireless network including, for example, a wide area network (WAN), a local area network (LAN), a public land mobile network (PLMN), the Internet, and/or the like.

The primary server 110 and/or the secondary server 120 may be running instances of the corresponding executables (e.g., .exe files) included in a kernel of the database system 100. It should be appreciated that the kernel of the database system 100 may also include other executable (e.g., .exe files) required for running the database system 100. In some implementations, an executable may be a computer program that have already been compiled into machine language (e.g., binary code) and is therefore capable of being executed directly by a data processor. As shown in FIG. 1, the database system 100 may be a dedicated, single-container database system running a single instance of the primary server 110 and/or the secondary server 120. However, where the database system 100 implements a multitenant database architecture (e.g., multitenant database containers (MDC)), each tenant of the database system 100 may be served by separate instances of the primary server 110 and/or the secondary server 120.

Referring again to FIG. 1, the primary server 110 and the secondary server 120 may be separate servers having different address spaces. For instance, the primary server 110 may be associated with a first address space 145a and the secondary server 120 may be associated with a second address space 145b. As used herein, an address space may refer to a range of memory addresses assigned to a computational entity such as, for example, the primary server 110 and/or the secondary server 120. In some example implementations, the primary server 110 may be a database index server configured to process incoming database queries. Meanwhile, the secondary server 120 may be a database script server configured to run database procedures. At least some database procedures including, for example, unknown and/or third-party database procedures, may be run on the secondary server 120 instead of the primary server 110 in order to avoid destabilizing the primary server 110 and/or causing a shutdown of the database system 100.

The database system 100 may be configured to process database queries from the first client 160a and/or the second client 160b. Processing these database queries may require running one or more application functions from an application function library 174. For example, the first client 160a and/or the second client 160b can send, to the database system 100, a database query that requires performing a predictive analysis operation on at least a portion of the data held by the database system 100. As such, in some example implementations, the database system 100 may be configured to install the application function library 174 by at least loading, into the first address space 145a associated with the primary server 110, a files/metadata library 172 of the application function library 174. In some implementations, the application function library 174 may be loaded on demand, e.g., upon determination that a certain application functions library may be required for execution of operations within a container.

In some implementations, compiling a descriptor file (e.g., an extensible markup language (XML) descriptor file) of the application function library 174 may generate, as a separate file, the files/metadata library 172. The files/metadata library 172 may include a description of the application functions included in the application function library 174 (which may be loaded into the container database system on demand). Loading the files/metadata library 172 into the first address space 145a of the primary server 110 may register, as database procedures, the application functions included in the application function library 174. For example, registering an application function as a database procedure may add the application function as a database object to a database catalog of the database system 100. It should be appreciated that the database catalog of the database system 100 may include definitions of a plurality of database objects including, for example, tables, views, indexes, users groups, procedures, and/or the like.

Once the files/metadata library 172 is loaded into the first address space 145a of the primary server 110, the application function library 174 may then be loaded on demand. For example, the database system 100 may load the application function library 174 in response to a database query that requires running one or more application functions from the application function library 174. Alternatively, or in addition to, the application function library 174 may be loaded upon determination either by a primary and/or a secondary server that an executed function may require access to another application function in an application function library that have not been loaded into the container database system. To further illustrate, the database system 100 may receive, from the first client 160a and/or the second client 160b, a database query. To process the database query, the primary server 110 may identify, based at least on the files/metadata library 172, the one or more application functions from the application function library 174 that is required to execute the database query. The primary server 110 may route the database query to the secondary server 120 for execution. Routing the database query to the secondary server 120 may trigger a loading of the application function library 174 into the second address space 145b associated with the secondary server 120. Here, the secondary server 120 may load the application function library 174 may be loaded into the second address space 145b in order to run the one or more application functions required to execute the database query.

In some implementations, the application function library engine 120 may be configured to determine that a particular application function library may be required for execution of a specific application function, operation of a system component. The application function library engine 120 may issue a call to obtain the required application function library from a storage location (e.g., a table where the application function library is stored as binary large object). The application function library 174 and any of its associated files 172 may be loaded into the address spaces 145a and 145b. If necessary, any existing application library may be unloaded from the address spaces 145a-b. Any loading and/or unloading of application function libraries to/from address spaces 145a-b of the primary server 110 does not require a full restart of the database system 100. The loading and/or unloading of the application function library 174 and/or its associated files may be performed on demand such as, for example, when the secondary server 120 is executing a database query that requires running one or more application functions from the application function library 174. In some cases, loading of the application function library 174 into the second address space 145b may generate one or more dependencies at the secondary server 120 such as, for example, global variables, memory allocations, trace topics, and/or the like. Thus, unloading the application function library 174 from the second address space 145b may require a restart of the secondary server 120. However, the secondary server 120 may be restarted without a full restart of the database system 100. As such, the application function library 174 can be unloaded without a full restart of the database system 100.

Figure 2:
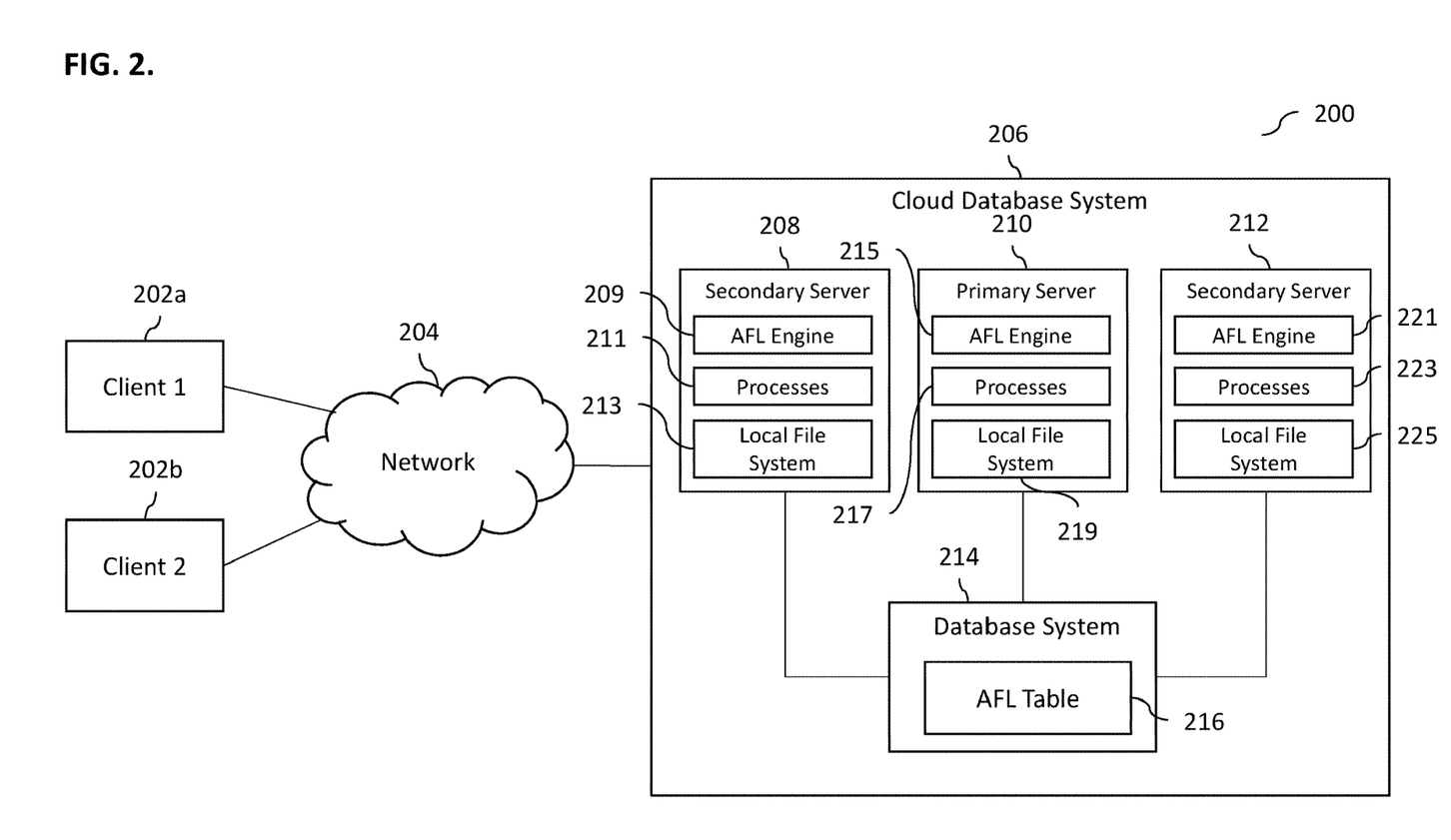
FIG. 2 illustrates an exemplary system for executing on-demand loading of an application function library in a cloud database system environment, according to some implementations of the current subject matter.

FIG. 2 illustrates an exemplary system 200 for executing on-demand loading of an application function library in a cloud database system environment, according to some implementations of the current subject matter. The system 200 may include one or more clients 202a, 202b that may access a cloud database system environment 206 via a network 204. The network 204 may be a wired and/or wireless network including, for example, a wide area network (WAN), a local area network (LAN), a public land mobile network (PLMN), the Internet, and/or the like.

The cloud database system environment 206 may include one or more computing nodes (e.g., elastic computing nodes). The nodes may include one or more containers 208, 210, 212. Each container 208-212 may be configured to include one or more processors and/or one or more memory locations (not shown in FIG. 2) for execution of various process instances and/or functions. For example, container 208 may be configured to execute one or more process instances 211 and may have a local file system 213, which may be accessible by the process instances of the container 208. The container 208 may also include an application function library engine (AFL Engine) (e.g., a calculation engine and/or any other computing component) 209. The engine 209 may be configured to determine whether one or more of the processes 211 executed within the container 208 requires a particular application function library. If an application function library is required, the application function engine 209 may issue an appropriate call to obtain that application function library (e.g., from the database system 214), as discussed herein.

Similarly, the container 210 may include an application function library engine 215, process instance(s) 217, and a local file system 219. In some implementations, the container 210 may be configured for execution of processes/functions associated with a primary server (e.g., an index server, as discussed above), whereas the container 208, and container 212, as shown in FIG. 2, may be configured for execution of processes/functions associated with a secondary server (e.g., a script server, as discussed above). As shown in FIG. 2, the container 212 may include its own application function library engine 221, process instance(s) 223, and a local file system 225. As can be understood, one or more primary servers 210 and/or one or secondary servers 208, 212, each operating in its own respective containers (e.g., disposed on separate computing nodes) may be included in the cloud database system environment 206. In some implementations, the servers may be configured to access the same table containing the BLOB and may read the same application function library, which may allow the same application library (and/or same version of the application function library) to be available to all servers in the system.

The cloud database system environment 206 may be configured to include a database system 214 that may be accessible (e.g., via queries, procedure calls, etc.) by the servers in containers 208-212. The database system 214 (e.g., High performance ANalytic Appliance (HANA), as available from SAP AG, Walldorf, Germany) may be configured to include one or more application function library tables or indexes (AFL Table(s)) 216 that may be configured to store one or more application function libraries. By way of a non-limiting example, the application function libraries may be stored as binary large objects (BLOBs) in one or more columns of tables 216. As can be understood, the application function libraries may be stored in tables 216 in any other form. In some implementations, during an initial installation, the application function library along with its accompanying files (e.g., metadata, etc.) may be inserted into a table as a BLOB and corresponding catalog objects may be generated.

The application function libraries stored in the tables 216 may be accessible by the application function library engines 209, 215, and 221 of servers running in the containers 208, 210, 212, respectively. The engines 209, 215, 221, upon determination that a particular application function library may be required for execution of a function, process, etc. (e.g., process(es) 211, 217, 223, respectively), may generate and transmit a call, query, etc. to the database system 214. As a result of receiving the call, the database system 214 may be configured to execute a search of the tables 216 to retrieve a requested application function library. Once the library has been retrieved, it along with any accompanying files (e.g., metadata, etc.) may be transmitted to the requesting engine 209, 215, 221. The accompanying files (e.g., metadata, etc.) may be loaded only once for the purposes of generating one or more catalog objects, hence, as long as the application function library has not changed, no new catalog objects may be required.

Once the engine(s) 209, 215, 221 receive respective requested application function libraries, the engine(s) may be configured to install the libraries in the containers 208, 210, 212, respectively. Further, the application function libraries along with their corresponding accompanying files may be stored in the local file systems 213, 219, 225, respectively. As stated above, the accompanying files may be loaded only once (assuming no changes to the application function library). Upon installation and storage in the local file system, the process instances (e.g., processes 211, 217, 223, respectively) may be configured to use application functions from the installed libraries during runtime. In some implementations, one or more catalog objects may be generated in the containers 208, 210, 212 corresponding to the installed application function libraries. The catalog objects may be stored in the local file systems of the containers and may be used to document installation of the application function libraries in the containers.

In some implementations, the cloud database system environment 206 may be configured to execute on-demand loading and installation/copying of application function libraries (subsequent to the initial installation that includes insertion of the BLOB) across a plurality of servers that are running in one or more containers. In some implementations, the application function library may be loaded at some but not all of the containers 208-212 within the system environment 206. For example, the on-demand loading and installation/copying of the application function library in the container 208 whereas the primary server executed in the container 210 may not require it for execution of a particular process running in that container. However, upon determination, by the AFL engine 215 of the container 210 that a specific application function library is needed for execution of a function, the AFL engine 215 may be configured to request the application function library for loading from the AFL table 216. By way of a non-limiting example, such determination may include the following exemplary scenarios: execution of a function in the container 208 reaches a function in the container 210 that does not have an application function library associated with the initial function installed, prompting the engine 215 to request installation/copying of the requisite application function library. Further, if a server in a container may need to load an application function library for execution of an application function, then the AFL engine (e.g., AFL engine 209, 215, etc.) in that server may be configured to read the application function library (along with any additional files, metadata, etc., if any) from the AFL table 216 and install/copy it to the file system of the container, assuming it is not yet available in the container's file system.

In some implementations, each container 208-212 in the system environment 206 may run its own instances of a primary server, a secondary server, and/or both. Each server may be an executable from a kernel of the container. As shown in FIG. 2, a secondary server may be a running instance of executable from the kernel of the container 208; a primary server may be a running instance of executable from the kernel of the container 210; etc.

Any associated files and/or metadata libraries of an application function library may be loaded into one space of a local file system of the container while the application function library may be loaded into the another space of the local file system of the container. Alternatively, or in addition to, the application function library and/or its associated files may be loaded into a single space of the local file system of the container.

In some implementations, the table(s) 216 of the database system 214 may be shareable by the servers (e.g., index server, script server, etc.) running in the containers 208-212. The servers may simultaneously request a particular application function library when that application function library is required by one of its respective processes. This avoids loading and installing/copying the application function library into every container, even if not required by any of the processes in that container.

By way of a non-limiting example, as stated above, a structured query language (SQL) may be used for query the application function library table 216 in the database system 214. The query may include a particular identifier associated with the application function library. Alternatively, or in addition to, the server may issue a query, without specifying a particular application function library, but rather a particular functionality that may require an application function library for execution. The loading of the application into a container may be executed during runtime (e.g., C++ runtime). In some implementations, for any subsequent procedure calls of an application function for the application function library that access the server(s) running in containers 208-212 and/or a compute node associated with containers 208-212 where the server(s) is/are running, that does not yet have the application function library installed in its local file system, that server may be configured to execute a query to the table 216 to obtain the application function library.

Figure 3:
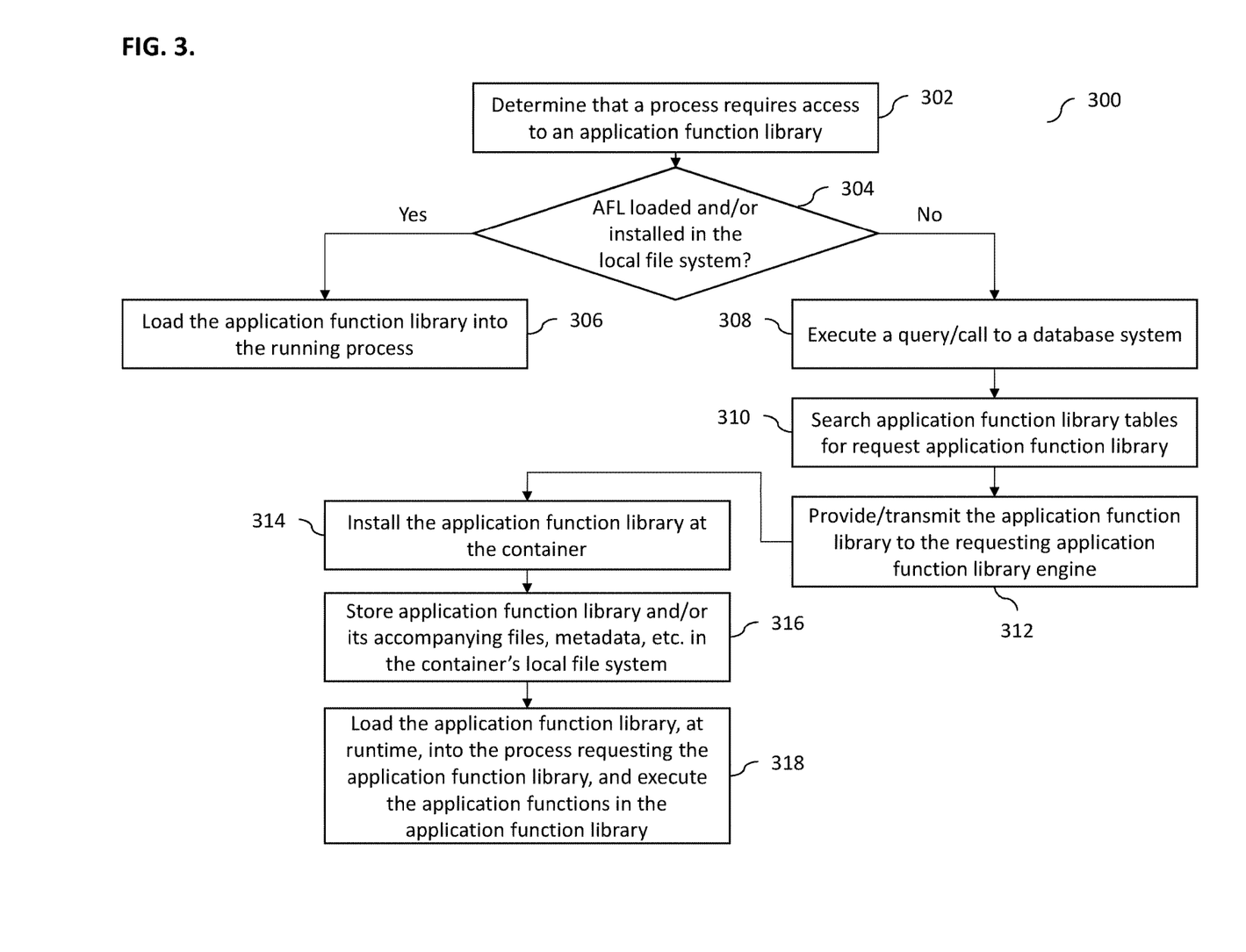
FIG. 3 illustrates an exemplary process for installing an application function library in a cloud database system environment, according to some implementations of the current subject matter.

FIG. 3 illustrates an exemplary process 300 for installing an application function library in a cloud database system environment, according to some implementations of the current subject matter. The process 300 may be executed by the system 200 shown in FIG. 2. At 302, a server (e.g., index server, script server, etc.) running in a container (e.g., container 208-212) may be configured to determine that one of the processes (e.g., processes 211, 217, 223, respectively) may require access to an application function library.

At 304, the container's application function library engine (e.g., engine 209, 215, 221, respectively) may be configured to determine whether the required application function library has been loaded and/or installed in the container's local file system (e.g., local file system 213, 219, 225, respectively). If it has been loaded/installed in the container's local file system, the container's engine may be configured to load the application function library into the running process requiring access to that application function library, at 306.

If the application function library requested by the running process in the container has not been loaded/installed in/copied to the container's local file system, the container's application function engine may be configured to execute a query/call to a database system 214 (shown in FIG. 2) and request access to its application function library table(s) 216, at 308. As stated above, the table(s) 216 may be configured to store one or more application function libraries. The tables may be searchable (either by the database system 214 and/or by the container's engines). A search, at 310, may be executed one or more application function library identifiers, identification of a specific function/process that may need an application function library for execution, and/or any other terms, parameters.

Once the requested application function library (along with its accompanying files, metadata, etc.) has been located, it may be provided/transmitted to the requesting application function library engine, at 312. Upon receipt, the application function library may be installed at/copied to the container, at 314. The application function library and/or its accompanying files, metadata, etc. may be stored in the container's local file system, at 316. Moreover, the application function library may be loaded, at runtime, into the process requesting the application function library, and the application functions in the application function library may be executed, at 318.

Figure 4:
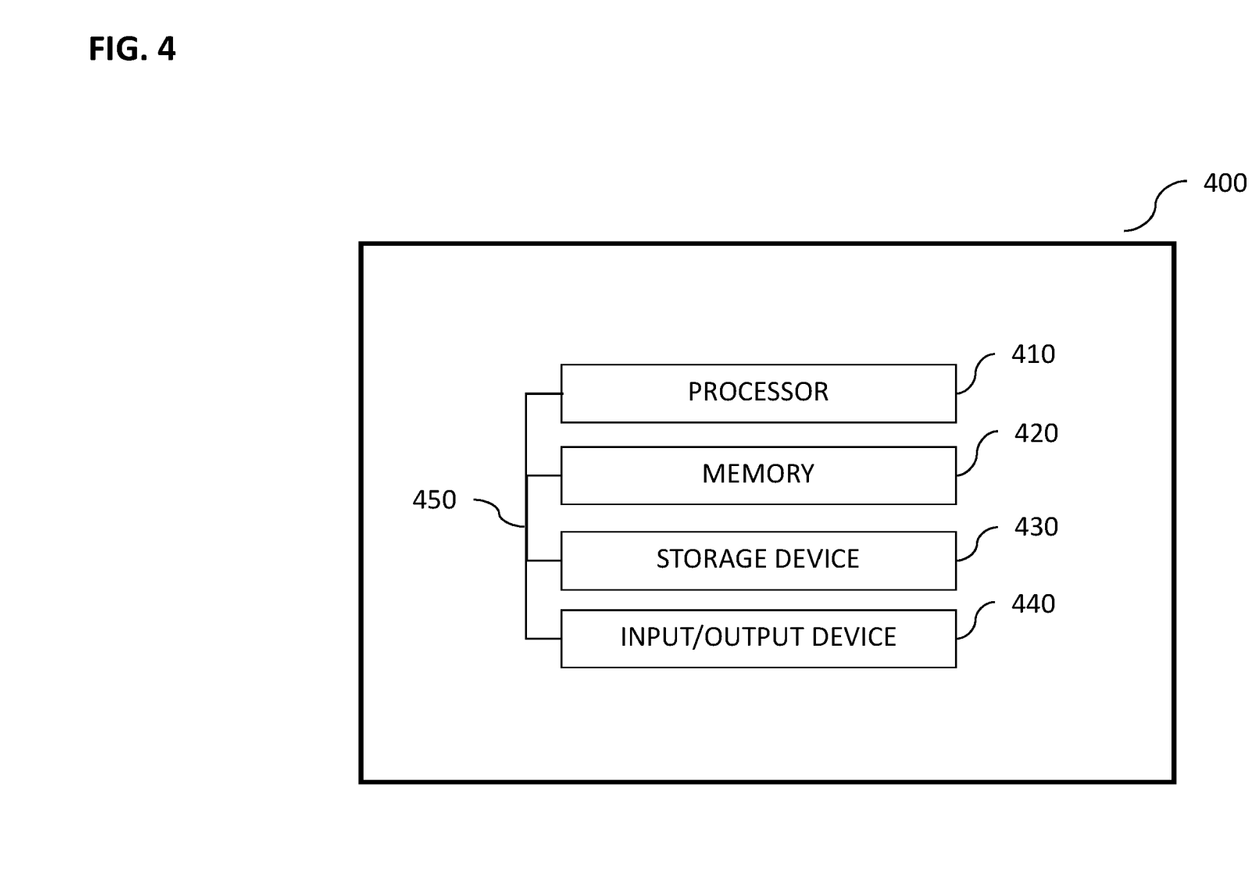
FIG. 4 is an exemplary system, according to some implementations of the current subject matter.

In some implementations, the current subject matter may be configured to be implemented in a system 400, as shown in FIG. 4. The system 400 may include a processor 410, a memory 420, a storage device 430, and an input/output device 440. Each of the components 410, 420, 430 and 440 may be interconnected using a system bus 450. The processor 410 may be configured to process instructions for execution within the system 400. In some implementations, the processor 410 may be a single-threaded processor. In alternate implementations, the processor 410 may be a multi-threaded processor. The processor 410 may be further configured to process instructions stored in the memory 420 or on the storage device 430, including receiving or sending information through the input/output device 440. The memory 420 may store information within the system 400. In some implementations, the memory 420 may be a computer-readable medium. In alternate implementations, the memory 420 may be a volatile memory unit. In yet some implementations, the memory 420 may be a non-volatile memory unit. The storage device 430 may be capable of providing mass storage for the system 400. In some implementations, the storage device 430 may be a computer-readable medium. In alternate implementations, the storage device 430 may be a floppy disk device, a hard disk device, an optical disk device, a tape device, non-volatile solid state memory, or any other type of storage device. The input/output device 440 may be configured to provide input/output operations for the system 400. In some implementations, the input/output device 440 may include a keyboard and/or pointing device. In alternate implementations, the input/output device 440 may include a display unit for displaying graphical user interfaces.

Figure 5:
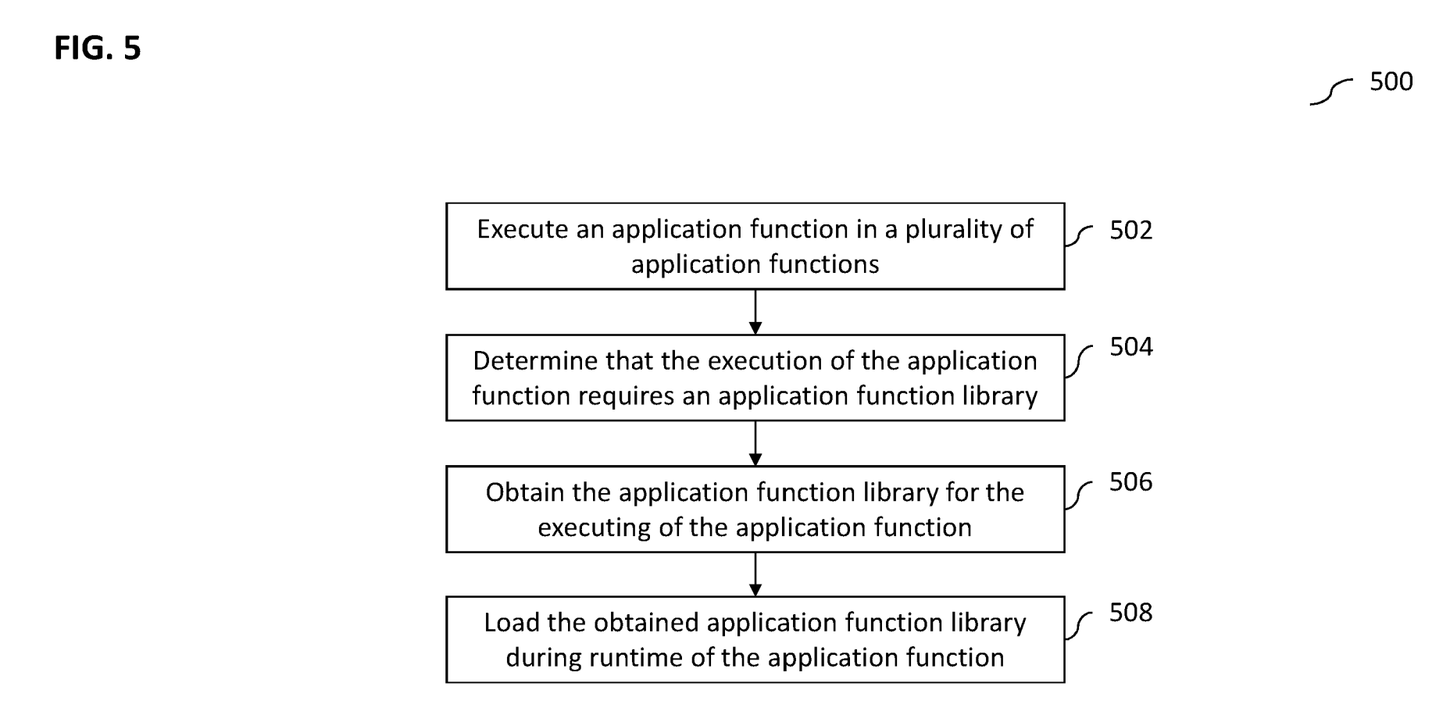
FIG. 5 is an exemplary method, according to some implementations of the current subject matter.

FIG. 5 illustrates an exemplary method 500 for on-demand installation of an application function library, according to some implementations of the current subject matter. At 502, an application function in a plurality of application functions may be executed. The application function may be executed using a server instance (e.g., an index or a primary server, a script or a secondary server, as shown in FIG. 2) that may be running in a container (e.g., container 208, 210, 212 as shown in FIG. 2).

At 504, a determination (e.g., using an application function library engine 209, 215, 221 as shown in FIG. 2) may be made that the execution of the application function may require a particular application function library. At 506, the required application function library for may be obtained (e.g., from an application function library table 216 stored in the database system 214 shown in FIG. 2) for the execution of the application function. At 508, the obtained application function library may be loaded (e.g., by the engine 209, 215, 221) during runtime of the application function.

In some implementations, the current subject matter includes one or more of the following optional features. In some implementations, the container may include one or more local file system storages (e.g., local file systems 213, 219, and/or 225 as shown in FIG. 2). The obtained application function library may be stored in one or more local file system storages. In some implementations, the loading may include loading, from the local file system storage, the obtained application function library during runtime of another application function.

In some implementations, the server may include at least one of an index server, a script server, and any combinations thereof.

In some implementations, the obtaining may include querying a storage location (e.g., database system 214 as shown in FIG. 2) storing the application function library. The storage location may be external to and communicatively coupled to the container (e.g., containers 208, 210, 212 as shown in FIG. 2). The storage location may store one or more tables (e.g., AFL tables 216) that may include a plurality of application function libraries. The obtaining may also include searching, using at least an identifier of the application function library, one or more tables to obtain the requested application function library, and retrieving, based on the searching, the application function library from the tables.

In some implementations, one or more application function libraries in the plurality of application function libraries may be stored in the one or more tables as binary large objects. Further, a structured query language may be used to query the storage location storing the application function library.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
   receiving a request to execute, using a server instance running in a container of a cloud based system, an application function of a plurality of application functions;
   determining that an execution of the application function requires an application function library;
   retrieving the application function library, for executing of the application function;
   installing the application function library at the container of the cloud based system by storing the application function library in a table having a binary large object column; and
   executing, using a server instance running in the container, the application function using the application function library, being accessible from the table.

2. The computer-implemented method of claim 1, wherein the container comprises one or more local file system storages, wherein the application function library is stored in the one or more local file system storages.

3. The computer-implemented method of claim 2, wherein installing comprises loading, from the one or more local file system storages, the application function library during runtime of another application function.

4. The computer-implemented method of claim 1, wherein the server comprises at least one of: an index server, a script server, and any combinations thereof.

5. The computer-implemented method of claim 1, wherein retrieving comprises:
   querying a storage location storing the application function library, the storage location being communicatively coupled to the container, the storage location storing one or more tables comprising a plurality of application function libraries;
   searching, using at least an identifier of the application function library, the one or more tables to generate a search result; and
   retrieving, based on the search result, the application function library.

6. The computer-implemented method of claim 5, wherein one or more application function libraries in the plurality of application function libraries are stored in the one or more tables as binary large objects.

7. The computer-implemented method of claim 5, wherein the querying comprises querying, using a structured query language, the storage location storing the application function library.

8. A system comprising:
   at least one programmable processor; and
   a non-transitory machine-readable medium storing instructions that, when executed by the at least one programmable processor, cause the at least one programmable processor to perform operations comprising:
   receiving a request to execute, using a server instance running in a container of a cloud based system, an application function of a plurality of application functions;
   determining that an execution of the application function requires an application function library;
   retrieving the application function library for executing of the application function;
   installing the application function library at the container of the cloud based system by storing the application function library in a table having a binary large object column; and
   executing, using a server instance running in the container, the application function using the application function library, being accessible from the table.

9. The system of claim 8, wherein the container comprises one or more local file system storages, wherein the application function library is stored in the one or more local file system storages.

10. The system of claim 9, wherein installing comprises loading, from the one or more local file system storages, the application function library during runtime of another application function.

11. The system of claim 8, wherein the server comprises at least one of: an index server, a script server, and any combinations thereof.

12. The system of claim 8, wherein retrieving comprises
   querying a storage location storing the application function library, the storage location being communicatively coupled to the container, the storage location storing one or more tables comprising a plurality of application function libraries;
   searching, using at least an identifier of the application function library, the one or more tables to generate a search result; and
   retrieving, based on the search result, the application function library.

13. The system of claim 12, wherein one or more application function libraries in the plurality of application function libraries are stored in the one or more tables as binary large objects.

14. The system of claim 12, wherein querying comprises querying, using a structured query language, the storage location storing the application function library.

15. A computer program product comprising a non-transitory machine-readable medium storing instructions that, when executed by at least one programmable processor, cause the at least one programmable processor to perform operations comprising:
   receiving a request to execute, using a server instance running in a container of a cloud based system, an application function of a plurality of application functions;
   determining that an execution of the application function requires an application function library;
   retrieving the application function library for executing of the application function;
   installing the application function library at the container of the cloud based system by storing the application function library in a table having a binary large object column; and
   executing, using a server instance running in the container, the application function using the application function library, being accessible from the table.

16. The computer program product of claim 15, wherein the container comprises one or more local file system storages, wherein the application function library is stored in the one or more local file system storages.

17. The computer program product of claim 16, wherein installing comprises loading, from the one or more local file system storages, the application function library during runtime of another application function.

18. The computer program product of claim 15, wherein the server comprises at least one of: an index server, a script server, and any combinations thereof.

19. The computer program product of claim 15, wherein retrieving comprises
- querying a storage location storing the application function library, the storage location being communicatively coupled to the container, the storage location storing one or more tables comprising a plurality of application function libraries;
- searching, using at least an identifier of the application function library, the one or more tables to generate a search result; and
- retrieving, based on the search result, the application function library.

20. The computer program product of claim 19, wherein one or more application function libraries in the plurality of application function libraries are stored in the one or more tables as binary large objects.

* * * * *